Sept. 25, 1923.
L. L. JONES
ELECTRIC BATTERY
Filed April 1, 1921
1,469,015
2 Sheets-Sheet 1
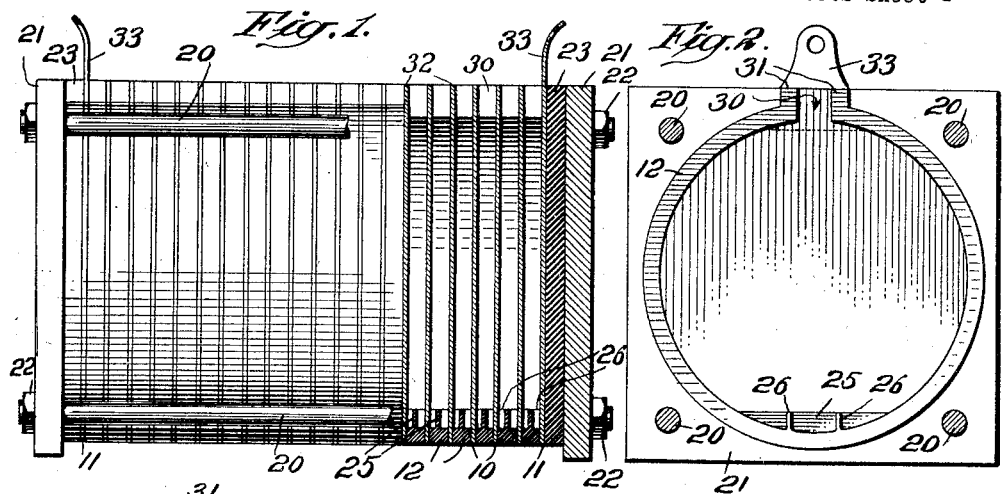
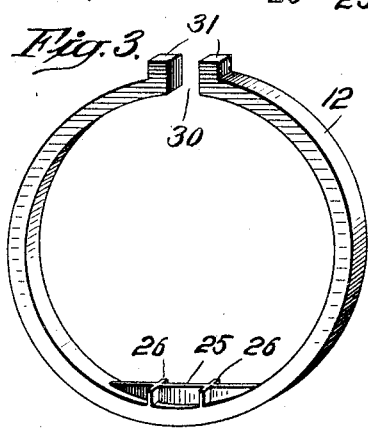
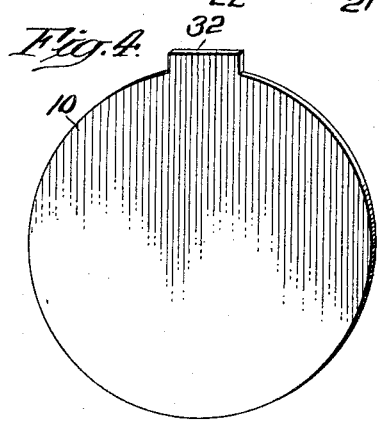
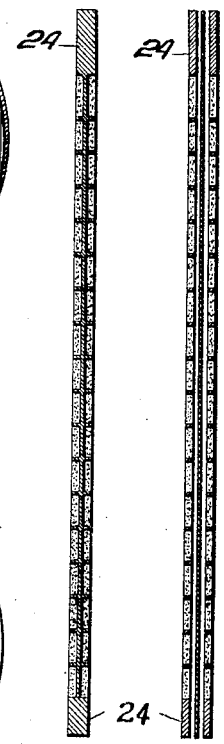
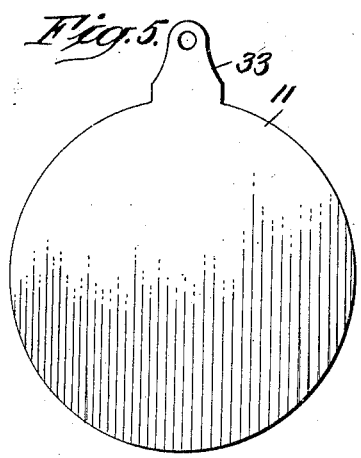
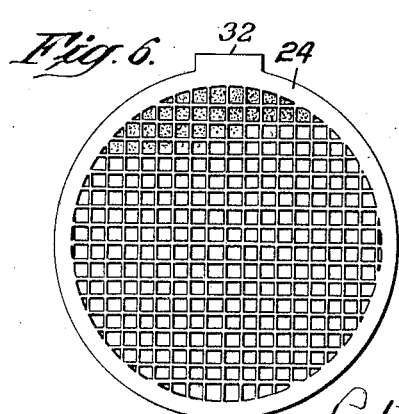
Inventor
Lester L. Jones Sept. 25, 1923.   1,469,015
L. L. JONES
ELECTRIC BATTERY
Filed April 1, 1921   2 Sheets-Sheet 2

Inventor
Lester L. Jones
By Arthur L. Kent
his Atty.

Patented Sept. 25, 1923.

1,469,015

UNITED STATES PATENT OFFICE.

LESTER L. JONES, OF NEW YORK, N. Y.

ELECTRIC BATTERY.

Application filed April 1, 1921. Serial No. 457,692.

*To all whom it may concern:*

Be it known that I, LESTER L. JONES, a citizen of the United States, residing at New York city, in the county of New York and State of New York, have invented certain new and useful Improvements in Electric Batteries, fully described and represented in the following specification and the accompanying drawings, forming a part of the same.

This invention relates to electric batteries, and more especially to secondary batteries of the lead cell type, although features of the invention are applicable to other types of secondary batteries and also to primary batteries.

In the making of secondary batteries it has been customary to enclose the electrodes of each cell in a separate electrolyte container of suitable insulating and acid resisting material, and in making batteries of multiple cell voltages to arrange a plurality of separate cells together and connect negative and positive elements of adjacent cells by metallic conductors outside the containers.

The present invention aims especially to improve the construction of secondary batteries, and more particularly to reduce the cost, weight and size of such batteries, producing at a substantial reduction in cost a relatively light and compact battery which shall be at least equally as efficient as the old style batteries and shall possess other advantages, such as a lessened liability to breakage.

My invention involves the idea of making one side of an electrode plate serve as a positive element in the battery and the other side of the same plate serve as a negative element in the battery, the plate being positioned with its opposite sides in contact with separate bodies of the electrolyte and being of such character as to provide a direct path for flow of current through the plate from the side which serves as a positive element to the side serving as a negative element. Using such two-element plates, a multi-cell series-connected battery is readily produced by separating and suitably spacing successive plates by means of suitable gaskets of insulating and electrolyte-resisting material engaging edge portions of the plates so as to form a series of cells or containers for the electrolyte separated by successive plates which thus form opposite walls of each such cell. The outer wall of each of the end cells will, of course, be formed by a plate of which the inner surface only is active. The invention involves the further idea of a battery cell, part of the wall of which is formed by a positive element or electrode and another part of the wall of which is formed by a negative electrode.

A full understanding of the invention can best be given by a detail description of a multiple-cell series-connected battery made in accordance with the invention, and such a description will now be given in connection with the accompanying drawings illustrating such a battery, and in which:—

Fig. 1 is a view partly in side elevation and partly in section of an approved form of lead cell secondary battery made in accordance with the invention;

Fig. 2 is a sectional view of the battery shown in Fig. 1;

Fig. 3 is a perspective view of one of the spacing and insulating gaskets;

Fig. 4 is a similar view of one of the intermediate two-element electrode plates;

Fig. 5 is a view of one of the end electrode plates;

Fig. 6 is a view showing one side of a suitable pasted plate for use in the battery; and Figs. 7 and 8 are enlarged sectional views of two-element pasted plates of different constructions.

Figure 9:
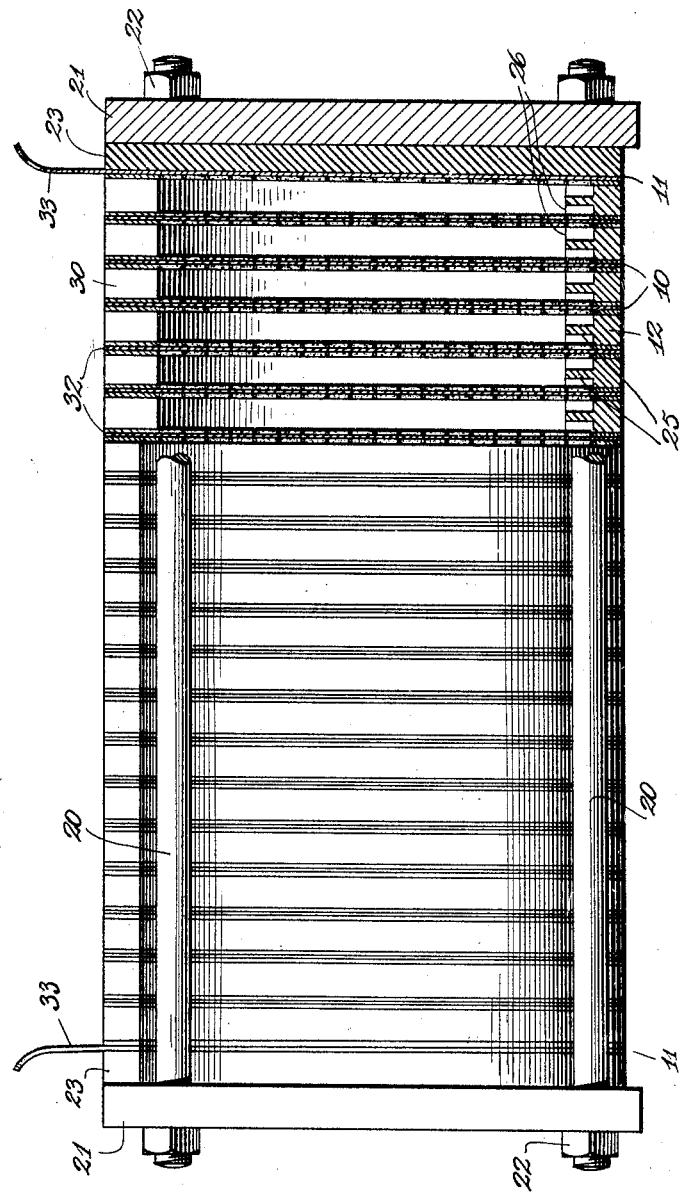
Fig. 9 is a view similar to Fig. 1 but showing a battery made with electrode plates of the kind shown in Fig. 8.

Referring to the drawings, and first to Figs. 1 to 5, the battery shown in Figs. 1 and 2 consists essentially of a series of intermediate electrode plates 10, two end electrode plates 11, and a series of edge gaskets 12 placed between adjacent plates so as to engage the edge portions of the sides of the plates and enclose the space between the plates except for a filling opening at the top of each cell space, the gaskets forming the edge walls of the cells or electrolyte containing spaces thus formed between the plates, and the plates serving as partition plates between adjacent cells. The gaskets are of suitable material resistant to and impervious to the electrolyte, and as the successive plates must be insulated from each other, the gaskets are insulating gaskets made in whole or in part of insulating material. Any suitable material answering these requirements may be used for making the gaskets, but I have found it most desirable to make the gaskets of hard rubber.

The two sides of each of the electrode plates 10 serve as elements of opposite polarity between which current may flow directly through the plate from the positive side to the negative side, and the opposed sides of adjacent plates forming opposite side walls of each cell are of opposite polarity, the cells thus being connected in series through the plates forming the cell walls. Only the inner side of each of the end plates 11 is in contact with electrolyte, these plates being, therefore, single element plates, one being a positive element at one end of the series of cells and the other being the negative element at the other end of the series.

The plates may be of any suitable construction and material. For a lead cell storage battery, the plates may, for example, be solid lead plates having originally plain lead surfaces smooth or indented, ribbed, or otherwise configured, forming plates of the Plante type. An intermediate plate and an end plate of this type are illustrated in Figs. 4 and 5. Or the plates may be pasted plates of suitable form. For example, Fig. 7 shows a section of a pasted plate having a solid lead body formed on opposite sides with a grid formation the interstices of which are filled with paste filler; and Figs. 8 and 9 illustrates a way of making the two-element pasted plate by means of two separately formed lead grids filled with paste filler and an interposed sheet or partition plate which is desirably also of lead and may be a sheet of lead foil. In Fig. 8 the two side or surface layer parts, forming respectively the positive and negative elements, and the interposed sheet or partition plate which is impervious to the electrolyte are shown for clearness of illustration as spaced slightly apart; but in use, the filled grids are positioned against the sheet, as shown in Fig. 9 being held in such position in any suitable manner. In a battery in which the plates and interposed edge gaskets are clamped together, the pressure of the clamping means will serve without other expedients for holding the parts of such a plate together. The end plates may be of usual or any suitable construction. The paste filler may be the usual filler of litharge, or other suitable material may be employed as in storage batteries of the construction heretofore commonly followed; and, of course, in a battery made in accordance with my invention, any suitable electrolyte may be employed according to the material of which the active layers of the plates are formed. The invention is of special advantage, however, for use in lead cell batteries employing dilute sulphuric acid as the electrolyte, as the construction avoids difficulties heretofore met with in the construction of such batteries due to the character of the electrolyte.

The plates and interposed gaskets, or other spacing strips between the edge portions of the plate, which form closures for the cells or electrolyte chambers between the plates, may be held in assembled relation in any suitable manner. Instead, however, of depending upon adhesive or cementing or other means acting directly between adjacent parts for holding the gaskets and plates in sealing contact, it is found most desirable to clamp the several plates and gaskets together in desired relative position by means of tension tie rods 20 extending between end pressure plates 21 and tightened by means of nuts 22 threaded on to one or both ends of the rods. The pressure plates 21 are desirably of metal, and in such case plates 23 of insulating material are interposed between the end plates 21 and the end electrode plates 11. After the plates and gaskets are so clamped together a surface coating of suitable material may be and desirably is applied thereto.

I find that with gaskets of hard rubber and electrode plates of lead a tight joint impervious to the electrolyte may be secured without the use of any packing or other sealing material between the gaskets and the plate. The electrode plates, whatever character they may be, are formed with edge portions 24 of suitable character to engage the sides of the gaskets and to form with the gaskets a solid wall and take the pressure of the clamping means.

The electrode plates and the separating gaskets may be of any suitable shape. The plates are most desirably circular and the gaskets of annular form as shown, but they may obviously be of practically any form desired. The use of annular gaskets is of great advantage in securing acid-tight joints between the gaskets and plates. Even a relatively light annular gasket will retain its circumferential shape under the strains to which it is subjected in the battery, and any cross-sectional deformation resulting from the clamping pressure is uniform throughout its circumferential length and it has no weak portions such as the corners or angles or square or other angular gaskets. In order to avoid short circuiting of the cells by means of material dropping from the surfaces of the plates, it is desirable to form each gasket with a thin flange 25 extending upward from its bottom portion parallel to the sides of the gasket and located centrally between the sides. Such a flange will provide a pocket on each side thereof at the bottom of the cell for receiving material dislocated from the surface of the plates, and the flange being of insulating material, short circuiting by reason of the accumulation of such material at the bottom of the cell will be prevented until sufficient material is accumulated to pile up over the top of the flange. In order to limit movement of such material in the bottom of the cell when the battery is moved about, which movement might result in a relatively small amount of such material piling up at one end of the flange, offsets 26 are desirably formed on the two sides of the flange to extend into engagement with the electrode plates.

As before stated, the gaskets are formed so as to leave a filling opening at the top of each cell, that is, each gasket is cut away or formed with an open space 30 in its top portion, and it is desirably formed with an upwardly extending lip 31 at each side of such opening. The electrode plates 10 are desirably formed each with a peripheral extension 32 to stand between the lips 31 of adjacent gaskets and to extend across the openings 30 of adjacent gaskets when the parts are assembled. The end electrode plates are formed with similar extensions 33 which are carried upward to serve one as the positive and the other as the negative terminal of the battery.

While to embody all the features of the invention a battery must have a plurality of cells, and the invention relates in some of its features especially to a battery having a plurality of series-connected cells, yet the invention is not limited in all its features to batteries having a plurality of cells, certain features of the invention as claimed being capable of embodiment in a single battery cell.

What is claimed is:

1. A storage battery, comprising a plurality of plates arranged flatwise to each other in spaced relation, the end plates being formed to serve as single element electrode plates and the intermediate plates being formed to serve as two-element electrode plates each having a surface layer on one side adapted to serve as a positive electrode and a surface layer on the other side adapted to serve as a negative electrode and an intermediate layer of conducting material impervious to the electrolyte providing a path for the flow of current between the electrode layers, and annular edge gaskets of insulating material impervious to the electrolyte between edge portions of adjacent plates forming edge walls of electrolyte chambers between the plates and insulating the plates from each other, said gaskets completely enclosing the space between adjacent plates except for a filling opening at the top of each chamber and making tight joints with the plates impervious to the electrolyte, each gasket being formed at the top to provide a filling opening.

2. A storage battery, comprising a plurality of plates arranged flatwise to each other in spaced relation, the end plates being formed to serve as single element electrode plates and the intermediate plates being formed to serve as two-element electrode plates each having a surface layer on one side adapted to serve as a positive electrode and a surface layer on the other side adapted to serve as a negative electrode and an intermediate layer of conducting material impervious to the electrolyte providing a path for the flow of current between the electrode layers, and annular edge gaskets of insulating material impervious to the electrolyte between edge portions of adjacent plates forming edge walls of electrolyte chambers between the plates and insulating the plates from each other, said gaskets completely enclosing the space between adjacent plates except for a filling opening at the top of each chamber and making tight joints with the plates impervious to the electrolyte, each gasket being cut away at the top to form a filling opening of the full width of the space between the plates.

3. A storage battery, comprising a plurality of plates arranged flatwise to each other in spaced relation, the end plates being formed to serve as single element electrode plates and the intermediate plates being formed to serve as two-element electrode plates each having a surface layer on one side adapted to serve as a positive electrode and a surface layer on the other side adapted to serve as a negative electrode and an intermediate layer of conducting materal impervious to the electrolyte providing a path for the flow of current between the electrode layers, and annular edge gaskets of insulating material impervious to the electrolyte between edge portions of adjacent plates forming edge walls of electrolyte chambers between the plates and insulating the plates from each other, said gaskets completely enclosing the space between adjacent plates except for a filling opening at the top of each chamber and making tight joints with the plates impervious to the electrolyte, each gasket being cut away at the top to form a filling opening of the full width of the space between the plates and having an upwardly extending lip at each side of the opening, and the plates extending upward between the lips of adjacent gaskets.

4. A storage battery, comprising a plurality of plates arranged flatwise to each other in spaced relation, the end plates being formed to serve as single element electrode plates and the intermediate plates being formed to serve as two-element electrode plates each comprising an inner layer or partition plate formed of a sheet of conducting material impervious to the electrolyte and two separately formed grids having their interstices filled with active material located one on either side of the partition plate, and edge gaskets of insulating material impervious to the electrolyte between edge portions of adjacent plates forming edge walls of electrolyte chambers between the plates and insulating the plates from each other, said gaskets completely enclosing the space between adjacent plates except for a filling opening at the top of each chamber and making tight joints with the plates impervious to the electrolyte, each gasket being formed at the top to provde a filling opening, and means for holding the plates and gaskets pressed together in assembled relation.

5. A battery, comprising a plurality of circular electrode plates arranged flatwise to each other in spaced relation, annular edge gaskets between edge portions of adjacent plates forming edge walls of electrolyte chambers between the plates and insulating the plates from each other, end pressure plates for exerting pressure on the end electrode plates, and tension rods extending between the pressure plates for holding the electrode plates and gaskets pressed together in assembled relation, the electrode plates being formed to present active electrode surfaces to the electrolyte and to provide conducting partitions impervious to the electrolyte 6. A battery cell, comprising opposite side walls formed by electrode plates each comprising a crcular plate of conducting material impervious to the electrolyte, an annular edge gasket between edge portions of the plates forming the edge wall of the cell and insulating the plates from each other, and means for holding the plates and gasket pressed together in assembled relation.

7. A battery cell, comprising opposite side walls formed by electrode plates each comprising a plate of conducting material impervious to the electrolyte and provided with a separately formed grid having its interstices filled with active material, an annular edge gasket of insulating material impervious to the electrolyte between edge portions of the plates forming the edge wall of the cell and insulating the plates from each other, and means for holding the plates and gasket pressed together in assembled relation.

8. A two-element battery plate, comprising an inner layer or partition wall formed of a sheet of conducting material impervious to the electrolyte, and two separately formed grids having their interstices filled with active material positioned one against either side of the inner layer or wall.

9. A two-element battery plate, comprising an inner layer or partition plate formed of a sheet of conducting material impervious to the electrolyte, and two separately formed grids having their interstices filled with active material located one on either side of the partition plate.

10. A two-element batery plate, comprising an inner layer or partition plate formed of a sheet of lead foil, and two separately formed grids having their interstices filled with active material located one on either side of the partition plate.

In testimony whereof I have hereunto set my hand in the presence of two subscribing witnesses.

LESTER L. JONES.

Witnesses:
 LOUIS H. FERBER,
 A. L. KENT.